United States Patent [19]
Garner

[11] 4,096,940
[45] Jun. 27, 1978

[54] CONVEYING APPARATUS
[75] Inventor: David Garner, Measham, England
[73] Assignee: Coal Industry (Patents) Limited, London, England
[21] Appl. No.: 554,525
[22] Filed: Mar. 3, 1975
[51] Int. Cl.² ............................................. B65G 47/18
[52] U.S. Cl. ..................... 198/560; 198/309; 198/311; 198/746; 299/67
[58] Field of Search ................ 198/14, 24, 82, 218, 198/222, 224, 226, 309, 311, 543, 560, 567, 736, 746; 299/18, 33, 43–45, 64, 65, 67

[56] References Cited
U.S. PATENT DOCUMENTS

| 3,455,432 | 7/1969 | Dawson | 299/43 |
| 3,832,924 | 9/1974 | Mickler et al. | 198/218 |

FOREIGN PATENT DOCUMENTS

| 1,255,197 | 12/1971 | United Kingdom | 198/224 |
| 1,223,857 | 3/1971 | United Kingdom | 299/43 |

*Primary Examiner*—Evon C. Blunk
*Assistant Examiner*—Joseph E. Valenza
*Attorney, Agent, or Firm*—Stevens, Davis, Miller & Mosher

[57] ABSTRACT

Packing paddles for conveying and packing broken rock and debris in a mine are pivotally mounted on mine roof supports. Hydraulic sequence valves are employed to operate hydraulic rams controlling the paddles. The valves, and thus the paddles, are operated in sequence to convey the debris from paddle to paddle.

5 Claims, 8 Drawing Figures

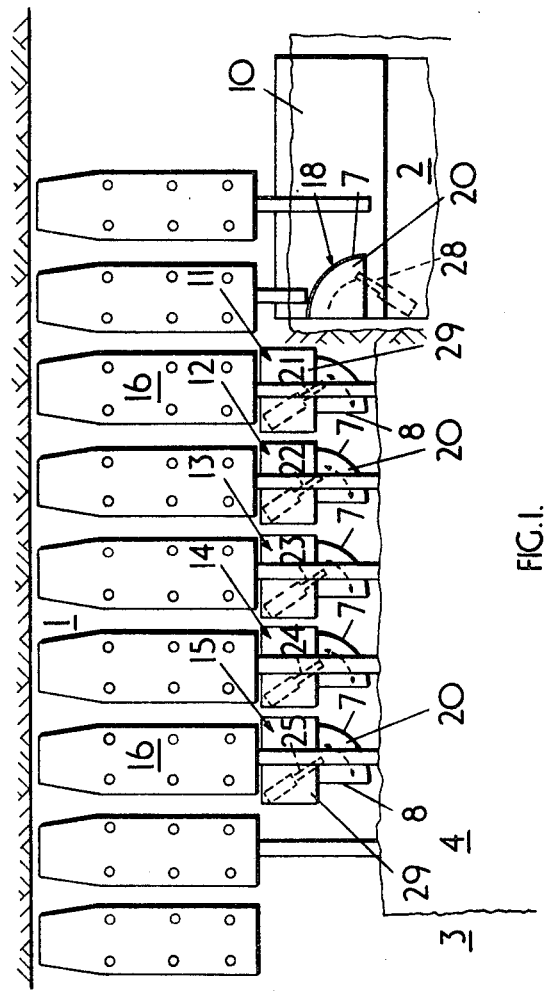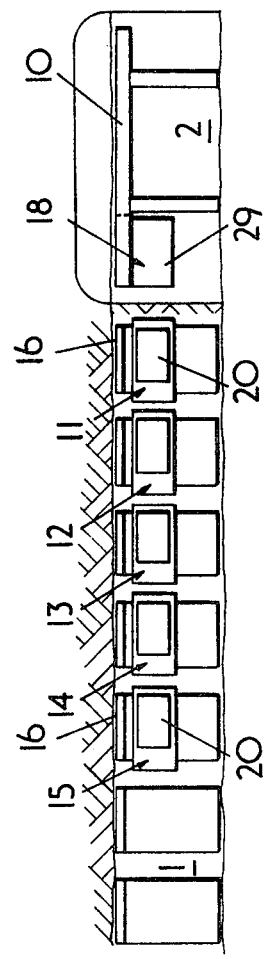

CONVEYING APPARATUS

This invention relates to conveying apparatus.

In particular, although not exclusively, the invention relates to conveying apparatus for conveying and packing broken rock debris in a goaf adjacent to a roadway leading to a working face in an underground mine, the broken rock debris being produced by the extension of the roadway as the working face advances.

One known such conveying apparatus comprises a series of angularly displaceable paddle devices pivotally mounted on an advanceable mine roof support, and displacing means for angularly displacing the paddle device so as, in use, to enable the device to convey and pack the broken rock debris. Such apparatus is described and claimed in the assignees prior British Pat. No. 1255197.

With such known apparatus an operational procedure has been adopted whereby all the paddle devices are actuated simultaneously in a similar mode, i.e. all the paddle devices are displaced simultaneously in the conveying direction and then all the paddle devices are displaced simultaneously in the non-conveying direction. Such a known operational procedure has the disadvantage that the conveying capacity of the conveying apparatus is relatively low.

An object of the present invention is to provide improved conveying apparatus which tends to overcome the above mentioned disadvantage.

According to the present invention conveying apparatus for conveying broken rock material comprises at least two displaceable paddle devices movably mountable on advanceable staker means, displacing means for displacing the paddle devices which are repeatedly traversable to and fro in a conveying mode and in a non-conveying mode, and control means for the displacing means which thereby, in use, traverse the paddle devices in the conveying mode in sequence.

Preferably, the displacing means comprise hydraulic rams associated with the paddle devices, respectively.

Preferably, the control means comprises a plurality of hydraulic sequence valves.

By way of example only, one embodiment of the present invention will be described with reference to the accompanying drawings, in which:

FIG. 1 is a plan of conveying apparatus for conveying and packing broken rock debris in an underground mine the apparatus being shown in an operational position;

FIG. 2 is a rear view of the conveying apparatus of FIG. 1;

Figure 7:
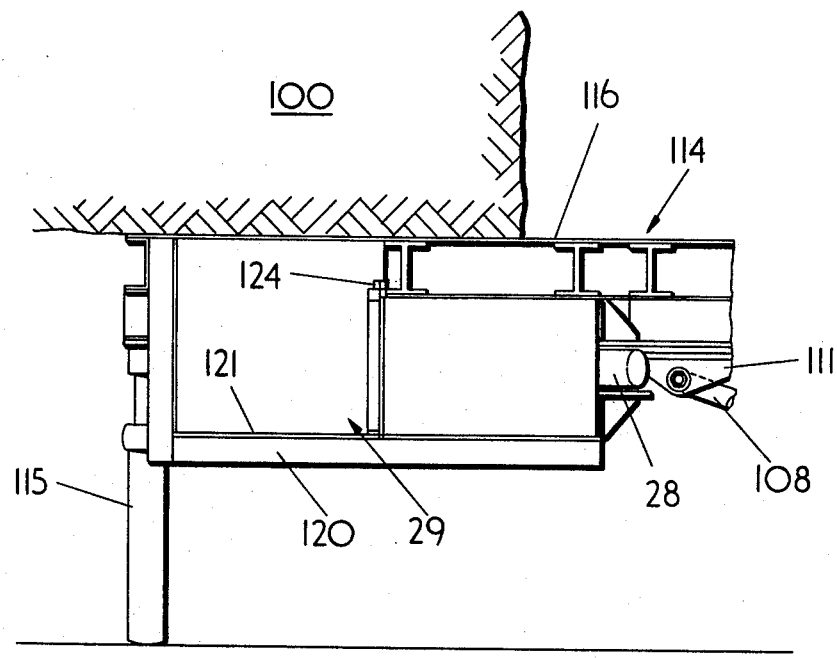
FIG. 7 is a scrap view taken in the direction of arrow X in FIG. 4.
Figure 8:
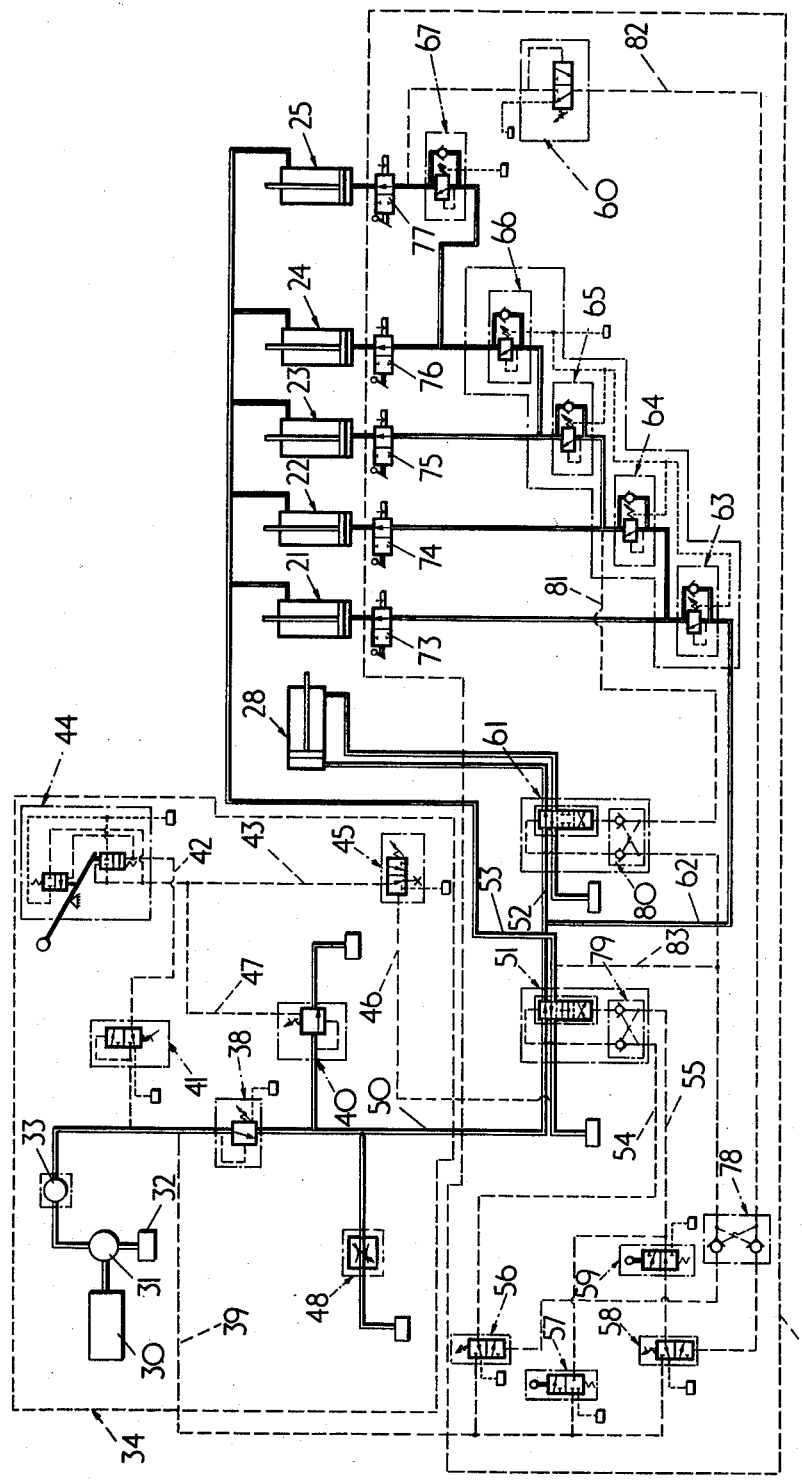

FIG. 8 is a hydraulic circuit diagram for controlling and activating the conveying apparatus of FIG. 1; Referring to FIGS. 1 to 7, the conveying apparatus is installed adjacent to a longwall working face 1 and extends from a roadway 2 towards the goaf 3 adjacent to the roadway. The conveying apparatus is arranged to convey and pack broken rock debris produced by the extension of the roadway as the working face advances, the debris being formed into packs 4 which support or help to support the mine roof in the vicinity of the roadway.

The conveying apparatus comprises a ripping table 10 (see especially FIGS. 3 to 7) situated within the roadway under the rock face to be excavated and a plurality of elevated paddle devices 11, 12, 13, 14 and 15 (see especially FIGS. 1 and 2) and mounted on the rear of self-advancing roof supports 16. In FIGS. 1 and 2 of the drawings five paddle devices are shown but this number could be changed to suit any particular installation.

A further paddle device 18 is mounted on the ripping table 10 and is arranged to feed broken rock debris from the ripping table towards the pack 4 into the path swept by the paddle device 11.

Figure 4:
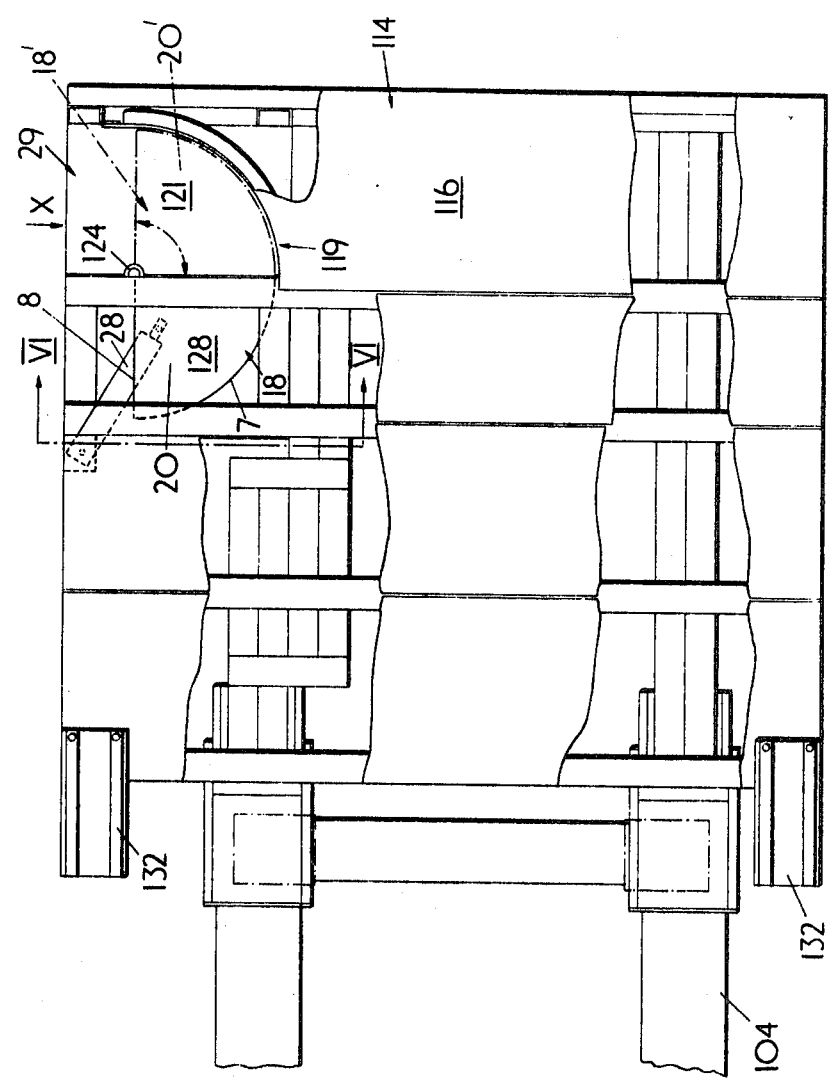
FIG. 4 is a plan of the apparatus of FIG. 3.

Each paddle device 11, 12, 13, 14, 15 and 18 comprises an angularly displaceable component 20 which pivots about a generally vertical pivot pin under the action of a hydraulic ram 21, 22, 23, 24, 25 and 28, the components being housed within elevated support housings 29 mounted on the roof supports 16 or under the ripping table 10. Each angularly displaceable component has a curved radially outer surface 7 which in use substantially extends along the path defined by the radially outer portion of the leading or working surface 8 of the associated components throughout the angular displacement of the component. As can be seen in FIGS. 1 and 4 each of the components is a quadrant looking in a direction normal to the plane of angular displacement of the component so that when the component is displaced fully out of its support housing 29 broken rock debris is prevented from passing behind the leading or working face 8. In FIG. 1, the components 20 are shown in their displaced positions with the rams extended and in FIG. 4, the component is shown at 20 in its withdrawn position and at 20' in its displaced position. The broken arrows indicate the directions of traverse of the components.

Figure 3:
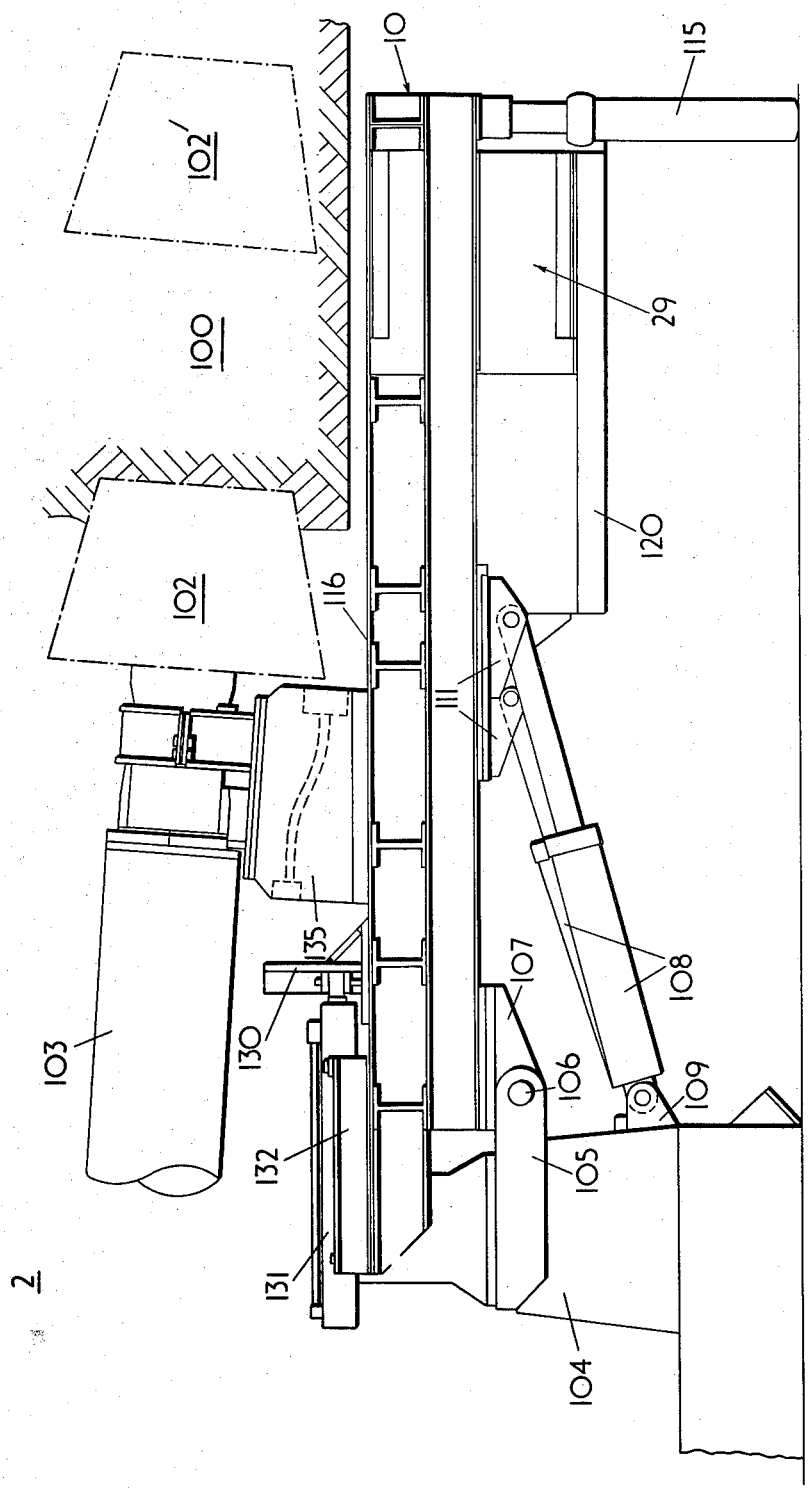
FIG. 3 is a side elevation of a part of the apparatus of FIG. 1, the part being shown on an enlarged scale.

FIGS. 3, 4, 5, 6 and 7 of the drawings show the ripping table 10 in more detail and in an operational position installed in an underground mine roadway adjacent to the rock face 100 which is excavated to extend the roadway 2. The rock face is excavated by means of a rotary cutter 102 mounted on a boom 103 (only a part of which is shown) of a mining machine (only the boom 103, cutter 102 and a part of the body 104 of which are shown) mounted in the roadway behind the apparatus. In FIGS. 3 and 7 the rock face 100 is about to be excavated by the rotary cutter 102 which is advanced into the rock face to a depth as illustrated by 102' in FIG. 3, i.e. approximately to the forward extent of the apparatus.

The ripping table is pivotally connected to support brackets 105 provided on the machine's body 104 by pivot pins 106 and brackets 107. The apparatus also is interconnected to the body 104 by two hydraulic rams 108 mounted between pivot brackets 109 and 111 provided on the body 104 and apparatus, respectively.

The ripping table comprises a deck assembly 114 secured at its rearmost end to the brackets 107 and supported at its forward end by two hydraulic props 115. The height of the deck assembly can be adjusted by operation of the previously mentioned rams 108. The deck assembly has an elevated deck 116 at least the forward portion of which is arranged to extend beneath the rock face 100.

A hopper constituted by the elevated support housing 29 is secured beneath an opening 119 (see FIG. 4) in the deck, the hopper being supported by two generally "L"-shaped brackets 120 secured to the deck assembly so that the hopper floor 121 forms a generally horizontal shelf extending from beneath the deck towards the side of the roadway. The hopper side adjacent to the side of the roadway is open to allow free passage of broken rock debris urged off the shelf by the displacing means 18 comprising the angularly displaceable component 20 which pivots about a generally vertical pivot pin 124 (see FIG. 4) under the action of a hydraulic ram 28 pivotally connected at its ends to the component and the deck assembly, respectively. In FIG. 4 the angularly displaceable component of the displacing means 18 is shown in its fully retracted position at 20 and in a displaced operating position where it is urging broken rock debris in a generally horizontal direction through the hopper opening at 20'. As previously stated the angularly displaceable component 20 has a curved radially outer face 7 which in use substantially extends along the path defined by the radially outer portion of the leading or working face 8 of the component throughout angular displacement of the component. As can be seen in FIG. 4 the component is a quadrant looking in a direction normal to the plane of angular displacement of the component so that when the component is displaced fully towards the hopper opening the opening 119 in the deck 116 is fully closed by the upper plate 128 of the component. Thus broken rock debris is prevented from passing behind the leading working face 8.

Figure 5:
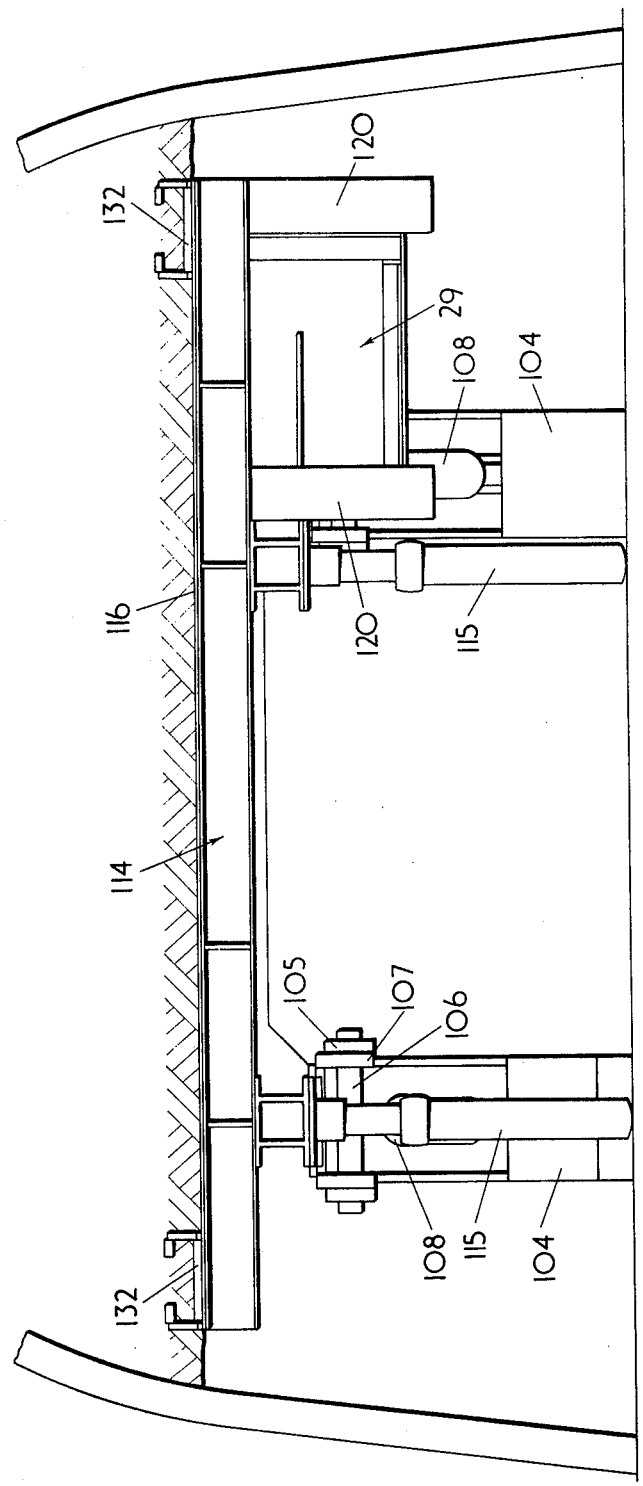
FIG. 5 is a front view of the apparatus of FIG. 3.
Figure 6:
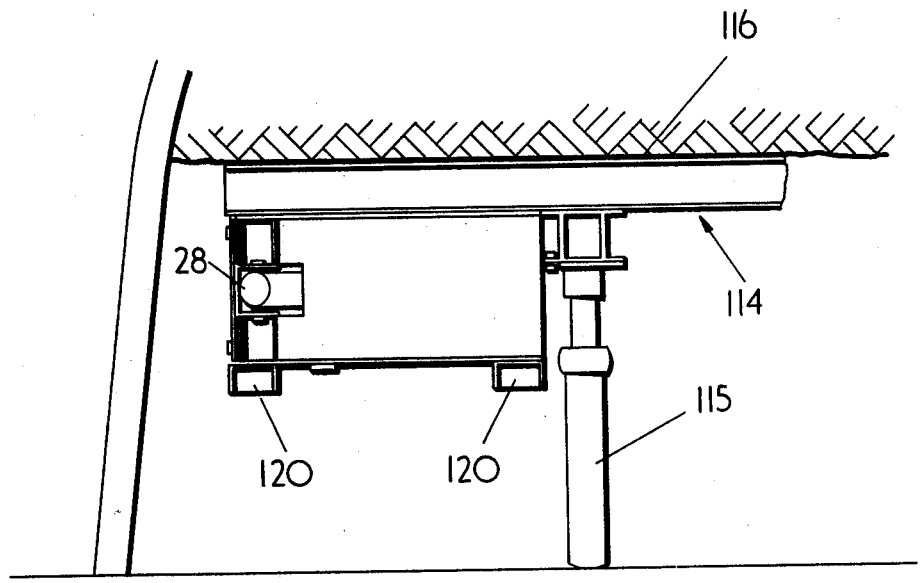
FIG. 6 is a scrap section taken along the line VI—VI of FIG. 4.

The apparatus also comprises a scraper blade 130 (see FIG. 3) which is arranged to slide over the deck 116 under the action of a hydraulic ram 131, the blade being guided in guides 132 (see FIGS. 3 and 5).

In use the apparatus is advanced with the mining machine 104 until at least the forward portion of the deck 116 is beneath the rock face 100 to be excavated by the rotary cutter 102. When the apparatus is fully advanced the rams 108 are extended until the deck 116 contacts the lower face of the rock to be excavated. Props 115 are set to support the forward portion of the deck assembly as shown in the drawings. The cutter 102 is then sumped into the rock face 100 adjacent to the opening 119 so that broken rock debris falls from the cutter 102 through the opening 119 into the hopper 29. As stated previously the cutter is sumped into the rock face until it reaches the position indicated at 102' in FIG. 3.

When the cutter is fully sumped into the rock face 100 it is traversed to and fro across the rock face until all the rock over the apparatus is excavated. As the cutter traverses across the rock face a loading plate 135 secured to the boom 103 urges the broken rock debris along the deck 116 towards the opening 119.

Upon the hopper 29 being filled with broken rock debris the ram 125 is extended to angularly displace the component 20 so that its leading or working face 8 pushes the broken rock debris over the hopper floor so that it is discharged through the side opening in the hopper wall. The debris discharges from the hopper into the goaf adjacent to the side of the roadway from where it can be transferred further into the goaf by the stowing means shown in FIGS. 1 and 2 positioned within the goaf at the side of the roadway 2.

When sufficient debris has been swept into the path of the paddle device 11 the component 20 of the paddle device 11 is displaced by the hydraulic ram 21 so that the upper portion of the pile of broken rock debris is urged into the path of the next adjacent paddle device 12. The operational procedure is repeated until the pack 4 extends along its full length, i.e. just beyond the path swept by the paddle device 15. At this stage only the lower portion of the pack 4 has been formed i.e. up to the lowermost surfaces of the paddle devices.

As more of the rock face 100 is excavated, the resulting broken rock debris is conveyed along the upper portion of the pack which thereby is formed up to the mine roof. This upper portion of the pack 4 is first formed at the end of the pack 4 remote from the roadway 2 and then extended towards the roadway. As the upper portion of the pack adjacent to a paddle device is formed the component 20 of the associated paddle device acts on the adjacent portion of the pack at the beginning of its conveying stroke i.e. when the leading or working surface is moving in a direction substantially normal to the conveying direction. Thus, the paddle device tends to push the debris in a direction transverse to the conveying direction and into the pack. Consequently, a dense pack tends to be formed without undesirable cavities which reduce the support efficiency of the pack 4. Conveying and packing continues until all the broken rock debris is packed and the upper portion of the pack extends to the side of the roadway. The conveying apparatus is then advanced under the newly exposed rock face and the operational procedure repeated.

The operation and control procedures of the conveying apparatus will now be described in more detail with reference to FIG. 8 which is the hydraulic circuit diagram for the conveying apparatus shown in FIGS. 1 to 7.

Referring now to FIG. 8, the drawing shows a hydraulic power pack comprising an electric motor 30, a pump 31, a tank 32 and a filter 33 and control equipment 34 and 35 as well as the previously mentioned hydraulic rams 21, 22, 23, 24, 25 and 28 for activating the components 20 of the paddle devices, 11, 12, 13, 14, 15 and 18 respectively.

The hydraulic equipment 34 comprises control valves and related circuitry for controlling the operation of the power pack. The hydraulic equipment 35 comprises control valves and related circuitry for controlling the operation of the conveying equipment.

The pressure fluid is fed from the pump 31 via filter 33 to a sequence valve 38 which ensures that whatever the condition of the hydraulic circuit on the output side of the valve a minimum pre-selected pressure is maintained on the inlet side of the valve. The minimum pressure is fed along pilot line 39 and in a typical installation is one hundred pounds per square inch. The pilot line 39 is fed to the hydraulic equipment 35 and its purpose will be described later in the specification. The hydraulic equipment 34 further comprises a relief and unloading valve 40 which in a typical installation relieves at two thousand pounds per square inch and an overload valve 41 which in a typical installation is set to unload at a pressure slightly higher than the relief pressure, and which unloads valve 40 by actuating valve 44 via pilot lines 42 and 47.

The control valve 44 can be actuated from its "on" condition into its "off" condition by a handle to stop pressure fluid being fed to the conveying apparatus. The control valve 44 also operates in conjunction with a pilot operated valve 45 which is sensitive to the supply pressure and which can actuate the control valve into its "off" condition when the supply pressure falls below a preselected level to ensure that once the motor 30 has been stopped pressure fluid cannot be fed to the conveyor apparatus upon restarting the motor until control valve 44 has been manually reset into its "on" condition. This is achieved by connecting the pilot operated valve 45 to sense the pressure of the fluid fed back to the tank 32. As soon as the motor 30 is stopped and the exhaust pressure falls, the pilot operated valve 49 senses the decrease in pressure through pilot line 46 and is actuated under its spring loading to exhaust the pressure fluid in pilot lines 43 and 47 thus actuating relief and unloading valve 40 to exhaust, which prevents pressure fluid being fed to the conveying apparatus. As soon as the pressure fluid in pilot line 43 is exhausted the control valve 44 moves to its "off" position and thus prevents pressure fluid being fed to the conveying apparatus.

The hydraulic equipment 34 also comprises a flow control valve 48 which is set at a preselected value to determine the flow along line 50 to the hydraulic equipment 35.

Pressure fluid is fed along line 50 to a directional control valve 51 which determines which of the lines 52 or 53 is coupled to the pressure line and which is coupled to tank. The position of the directional control valve is controlled by pilot pressure signals fed along pilot lines 54 and 55 which are fed from pilot operated valves 56, and 58 and manual control valves 57 and 59. The operation of the valves will be discussed later in the specification. A pilot operated valve 60 is provided to stop premature unlocking of check valve assembly 78 discussed later in the specification.

Pressure fluid is fed from the directional control valve 51 along line 52 to a further directional control valve 61 which controls the supply of pressure fluid to the ram 28. A branch line 62 is fed from the line 52 to the first of a series of sequence valves 63, 64, 65, 66 and 67 associated with the rams 21, 22, 23, 24 and 25 respectively. Each of sequence valves 64, 65, 66 and 67 is set to be actuated at a preselected pressure slightly higher than the set pressure of the previous sequence valve 63, 64, 65 and 66 respectively. Thus, in a typical installation the sequence valve 63 is set to operate at a pressure of fifteen hundred pounds per square inch while the sequence valve 67 is set to operate at a pressure of seventeen hundred pounds per square inch, the valves 64, 65 and 66 being set to operate at intermediate pressures. The supply of pressure fluid from the sequence valves 63, 64, 65, 66 and 67 to the associated rams is controlled by manual stop valves 73, 74, 75, 76 and 77, respectively. Pilot operated check valves assemblies 78, 79 and 80 which are provided in the hydraulic equipment 35 will be discussed in the following operational procedure of the conveying equipment.

In operation of the conveying and packing apparatus the motor 30 is started and the handle of the valve 44 is set to the operating position. Upon the pressure reaching the preselected value the sequence valve 38 opens to feed pressure fluid along line 50 to the directional control valve 51 of the hydraulic equipment 35. The pressure fluid is fed via directional control valves 51 and 61 to actuate the ram 28 which thereby displaces the component 20 of the paddle device 18 to feed broken rock debris from the ripping table towards the pack and in the path swept by the component 20 of the paddle device 11.

When the ram 28 is fully extended, the pressure in the lines 52 and 62 builds up until it reaches the previously mentioned preselected pressure at which the sequence valve 63 operates to feed pressure fluid to the ram 21 which thereby extends to displace component 20 of the paddle device 11 which thereby urges the broken rock debris further along the pack and into the path swept by the component 20 of the next adjacent paddle device 12.

When the ram 21 is fully extended the pressure in the hydraulic circuit increases further (until it reaches the previously mentioned preselected pressure at which the sequence valve 64 operates to feed pressure to the ram 22) and the directional control valve 61 is moved by pressure fed along pilot line 81 and through the pilot operated check valve assembly 80 to reverse the feed connections to the ram 28 which retracts and withdraws the component 20 of the paddle device 18 back to its initial position where it can be reloaded with broken rock debris. Thus, loading of broken debris can be carried out while the conveying apparatus is conveying previous loads of broken rock debris along the pack. The ram 22 still fed with pressure fluid extends to displace component 20 of the paddle device 12 which thereby urges the broken rock debris further along the pack and into the path swept by the component 20 of the next adjacent paddle device 13.

The pressure in the hydraulic circuit continues to increase until it is sufficient to operate the sequence valve 65 which then feeds pressure fluid to extend the ram 23 and thereby displace the component 20 of the paddle device 13 to urge the broken rock debris further into the pack into the path swept by the component 20 of the paddle device 14.

When the ram 23 is fully extended the pressure in the hydraulic circuit increases until it is sufficient to operate the sequence valve 66 which feeds pressure fluid to actuate the ram 24 to displace the component 20 of the paddle device 14 to urge broken rock debris into the path swept by the component 20 of the paddle device 15. When the ram 24 is fully extended the pressures in the hydraulic circuit increase to operate the sequence valve 67 which feeds pressure fluid to the ram 25 to displace the component 20 of the paddle device 15. The paddle device 15 urges the broken rock debris towards the end of the pack adjacent to the goaf.

When the ram 25 is fully extended, the pressure in the hydraulic circuit increases until at a preselected pressure, for example seventeen hundred and fifty pounds per square inch, the pilot operated valve 58 is actuated against its spring loading by the pressure acting in the pilot line 82 through the pilot operated check valve assembly 78. The pilot operated valve 58 moves to allow pilot pressure in the pilot line 39 from the hydraulic equipment 34 to pass to the pilot operated valve 59 which feeds the pilot pressure via the pilot operated check valve assembly 79 to the directional control valve 51 which is thereby actuated to reverse the feed connection to the rams, 21, 22, 23, 24 and 25 which are actuated to withdraw the components 20 of the associated paddle devices 11, 12, 13, 14 and 15, respectively.

Once all the rams are fully retracted the pressure in the hydraulic circuit increases until at a preselected pressure the pilot operated valve 56 is actuated by the pressure in pilot line 83 acting through the pilot operated check valve assembly 78, to feed pilot pressure from the line 39 via the pilot operated check valve assembly 79 to the directional control valve 51 which is thereby moved to once again reverse the feed connections to the rams 28, 21, 22, 23, 24 and 25. Thus, the whole procedure is repeated as previously described.

Each of the pilot operated check valve assemblies 78, 79 and 80 are arranged such that when pilot pressure is fed to one line in the assembly the check valve associated with the other line in the assembly is released to exhaust pressure from the said other line.

The manual control valves 57 and 59 are provided to override the pilot operated valves 56 and 58 to actuate the directional control valve 51 should this valve malfunction due, for example, to an air lock in the system. Actuation of the valves 57 and 59 restarts the automatic sequence.

Thus, the whole operational procedure is repeated until the lower portion of the pack is completed to just beyond the paddle device 25.

As further material is fed into the pack by the paddle devices, the paddle device 15 is unable to push the broken rock debris further into the pack and so the broken rock debris starts to build up on top of the lower portion of the pack to form an upper portion which extends up to the mine roof. As the upper portion is extended back towards the roadway, the component 20 of the paddle device 15 is prevented from being displaced fully and as a result the action of the said component on the broken rock debris is to push it in a direction transverse to the conveying direction towards the last formed pack. Thus the conveying and packing apparatus tends to consolidate the pack and thereby avoid the formation of cavities which otherwise would reduce the roof supporting capability of the pack.

As more broken rock debris is conveyed by the remaining paddle devices the upper portion of the pack is completed by each of the paddle devices 14, 13, 12 and 11 in turn until the pack is completed up to the roadway side and all the broken rock debris from the excavated rock face is packed.

When the pack is completed the motor 30 is switched off and the conveying apparatus advanced towards the working face. The ripping table is positioned under the newly exposed rock face and the paddle devices 11, 12, 13, 14 and 15 are advanced with the roof supports.

The whole operational procedure is then repeated.

From the above description it can be seen that the present invention provides conveying apparatus which is efficient in operation since the receiving section of the apparatus can be reloaded with broken rock debris while the remaining sections of the apparatus are conveying debris from an earlier load.

Also the effective conveying length of the apparatus can be varied by turning off the feed of pressure fluid to the rams 25, 24, 23 associated with the paddle devices 15, 14, 13 most remote from the roadway, the feed to those rams simply being "cut off" or "introduced" by operation of the valves 77, 76, 75 respectively.

The hydraulic equipment 35 also lends itself to the addition of further paddle devices to extend the pack further into the goaf. Such a procedure would be desirable if it was decided to increase the cross sectional area of the roadway giving rise to more broken rock debris.

The hydraulic equipment 34 and 35 is mounted in the gate roadway where it is easily accessible to an operator who may be the ripping machine operator. Thus, one operator can control the operation of the excavating of the rock face as well as the conveying and packing of the broken rock debris.

From the above description it will be seen that the components 20 of the paddle devices work in a preselected sequence which enables efficient operation of the conveying and packing apparatus to be achieved. Since only one ram 28, 21, 22, 23, 24 or 25 is actuated at any one time it is possible to maintain a sufficiently high working pressure in the hydraulic system. In previous conveying apparatus where all the components of the paddle devices were simultaneously actuated the pressure in the system fluctuated so that there was frequently a time after operation of the manual control valve before the components were displaced. Such a known operational procedure was inefficient and the handling capacity of the apparatus was below the minimum required for underground conveying and packing apparatus.

In other embodiments of the invention the pivotally mounted paddle device 28 may be replaced by any other form of suitable paddle or conveying devices, for example, a debris pushing blade slidable along a linear path under the action of a ram.

I claim:

1. Apparatus for packing broken rock debris adjacent to a roadway in an underground mine, comprising a deck assembly mountable in the roadway and having an elevated deck, a hopper located below the deck for receiving broken rock debris falling from the deck, a first displaceable paddle device movably mounted so as to urge broken rock debris out of the hopper in a generally horizontal direction, a second displaceable paddle device movably mountable on advanceable staker means, displacing means for displacing said first and second paddle devices which are repeatedly traversable to and fro in a conveying mode and in a non-conveying mode, and control means for the displacing means which thereby, in use, traverse the paddle devices in the conveying mode in sequence.

2. Apparatus as claimed in claim 1, in which the control means is arranged to traverse at least one of the paddle devices in the non-conveying mode before the conveying mode sequence is complete.

3. Apparatus as claimed in claim 2, comprising at least one hydraulic stop valve associated with one of the hydraulic sequence valves to override the hydraulic sequence valve.

4. Apparatus as claimed in claim 3, comprising a control valve which in its "off" condition overrides the control means to prevent actuation of the displacing means and which can only be set in its "on" condition manually.

5. Apparatus as claimed in claim 4, comprising a pilot operated hydraulic pressure sensitive valve which senses the pressure of the hydraulic supply and which actuates the control valve into its "off" condition when the sensed pressure falls below a preselected level.

* * * * *